United States Patent [19]

Kataoka

[11] Patent Number: 5,778,107
[45] Date of Patent: Jul. 7, 1998

[54] POSITION RECOGNITION METHOD

[75] Inventor: Takayuki Kataoka, Osaka, Japan

[73] Assignee: Kabushiki Kaisha Komatsu Seisakusho, Tokyo, Japan

[21] Appl. No.: 953,422

[22] Filed: Oct. 17, 1997

Related U.S. Application Data

[63] Continuation of Ser. No. 362,939, Dec. 23, 1994, abandoned.

[30] Foreign Application Priority Data

Dec. 24, 1993 [JP] Japan ................. 5-328751

[51] Int. Cl.$^6$ .................................................. G06K 9/36
[52] U.S. Cl. .................. 382/291; 382/151; 382/205
[58] Field of Search ....................... 382/106, 197, 382/202, 209, 151, 291; 701/49, 213, 214

[56] References Cited

U.S. PATENT DOCUMENTS

| | | | |
|---|---|---|---|
| 4,021,778 | 5/1977 | Ueda et al. | 382/209 |
| 4,581,762 | 4/1986 | Lapidas et al. | 382/209 |
| 4,817,172 | 3/1989 | Cho | 382/198 |
| 4,876,728 | 10/1989 | Roth | 382/199 |
| 4,905,162 | 2/1990 | Hartebard et al. | 382/209 |
| 4,972,493 | 11/1990 | Chemaly | 382/205 |
| 5,046,852 | 9/1991 | Hametner et al. | 382/319 |
| 5,109,431 | 4/1992 | Nishiya et al. | 382/209 |
| 5,142,659 | 8/1992 | Rao et al. | 382/106 |
| 5,305,395 | 4/1994 | Mahoney et al. | 382/205 |

*Primary Examiner*—Yon J. Couso
*Attorney, Agent, or Firm*—Nikaido, Marmelstein, Murray & Oram LLP

[57] ABSTRACT

A position recognition method wherein the photographic image of an object having a concavity or convexity defined therein is converted into specified feature space data; detection is performed to determine whether the specified feature space data possessed by each elementary area of the converted image has a symmetric relation with one possessed by another elementary area with a virtual center of the concavity or convexity being the center of symmetry; and the position of the concavity or convexity of the object is recognized based on the detection.

7 Claims, 7 Drawing Sheets

|   | 3 | 3 | 4 | 5 | 5 |   |
|---|---|---|---|---|---|---|
|   | 3 | 3 | 4 | 5 | 5 |   |
|   | 2 | 2 | 8 | 6 | 6 |   |
|   | 1 | 1 | 0 | 7 | 7 |   |
|   | 1 | 1 | 0 | 7 | 7 |   |

FIG. 6

| 0 | 1 | 2 | 3 | 4 | 5 | 6 | 7 |
|---|---|---|---|---|---|---|---|
| 1 1 1 | 1 1 1 | -1 1 1 | -1-1 1 | -1-1-1 | 1-1-1 | 1 1-1 | 1 1 1 |
| 1-2 1 | -1-2 1 | -1-2 1 | -1-2 1 | 1-2 1 | 1-2-1 | 1-2-1 | 1-2-1 |
| -1-1-1 | -1-1 1 | -1 1 1 | 1 1 1 | 1 1 1 | 1 1 1 | 1 1-1 | 1-1-1 |
| ↑ | ↗ | → | ↘ | ↓ | ↙ | ← | ↖ |

| 1 | 0 | 0 |   |   |
|---|---|---|---|---|
| 0 | A | 0 |   |   |
| 0 | 0 | 0 |   |   |
|   |   |   |   |   |
|   |   |   |   |   |

(b)

|   |   |   |   |   |
|---|---|---|---|---|
|   | 1 | 1 | 1 |   |
|   | 1 | A | 1 |   |
|   | 1 | 1 | 1 |   |
|   |   |   |   |   |

FIG. 8

| A 0 | 1 0 | C 2 0 | 3 0 | 4 0 | 5 0 | 6 0 |
|---|---|---|---|---|---|---|
| 0 | 1 0 | 2 0 | 3 0 | 4 0 | 5 0 | 6 0 |
| D 0 | 1 0 | B 2 0 | 3 0 | 4 0 | 5 0 | 6 0 |
| 0 | 1 0 | 2 0 | 3 0 | 4 0 | 5 0 | 6 0 |
| 0 | 1 0 | 2 0 | 3 0 | 4 0 | 5 0 | 6 0 |
| 0 | 1 0 | 2 0 | 3 0 | 4 0 | 5 0 | 6 0 |
| 0 | 1 0 | 2 0 | 3 0 | 4 0 | 5 0 | 6 0 |

FIG. 12

| A 0 | 0 | C 0 | 0 | 0 | 0 | 0 |
|---|---|---|---|---|---|---|
| 1 0 | 1 0 | 1 0 | 1 0 | 1 0 | 1 0 | 1 0 |
| D 2 0 | 2 0 | B 2 0 | 2 0 | 2 0 | 2 0 | 2 0 |
| 3 0 | 3 0 | 3 0 | 3 0 | 3 0 | 3 0 | 3 0 |
| 4 0 | 4 0 | 4 0 | 4 0 | 4 0 | 4 0 | 4 0 |
| 5 0 | 5 0 | 5 0 | 5 0 | 5 0 | 5 0 | 5 0 |
| 6 0 | 6 0 | 6 0 | 6 0 | 6 0 | 6 0 | 6 0 |

FIG. 13

| A<br>40 | 40 | C<br>40 | 40 | 40 | 40 | 40 |
|---|---|---|---|---|---|---|
| 40 | 50 | 50 | 50 | 50 | 50 | 40 |
| D<br>40 | 50 | B<br>70 | 80 | 70 | 50 | 40 |
| 40 | 50 | 80 | 80 | 80 | 50 | 40 |
| 40 | 50 | 70 | 80 | 70 | 50 | 40 |
| 40 | 50 | 50 | 50 | 50 | 50 | 40 |
| 40 | 40 | 40 | 40 | 40 | 40 | 40 |

FIG. 14

| 1 | 2 | 3 | 4 | 5 | 6 |
|---|---|---|---|---|---|
| (1, 0, 0) | (0, 1, 0) | (0, 0, 1) | (−1, 0, 0) | (0, −1, 0) | (0, 0, −1) |

POSITION RECOGNITION METHOD

This application is a continuation of application Ser. No. 08/362,939 filed Dec. 23, 1994, now abandoned.

BACKGROUND OF THE INVENTION

1. Field of the Invention

The present invention relates to a position recognition method for recognizing the position of a concavity or convexity defined in an object, based on the photographic image of the object, and in particular, to a position recognition method well suited for use in industrial robots, vehicle location monitoring systems or the like.

2. Description of the Invention

One known position recognition method is designed such that when recognizing the position of, for example, a hole which is a typical form of a concavity defined in an object, position recognition is achieved by estimating the center of the contour (i.e., circle or ellipse) of the hole by Hough conversion. Another known method is designed to recognize the position of a hole by attempting a correlation between the contour of the hole to be recognized and each of circles or ellipses which have been preliminarily registered by the use of normalized cross correlation.

SUMMARY OF THE INVENTION

These methods, however, present disadvantages. The former method needs vast amounts of memory capacity and long processing time since the center of the circle or ellipse is estimated within a three-dimensional space and therefore this method is not suitable for practical use. The latter method suffers from the problems that shapes of circles or ellipses preliminarily registered as the two-dimensional projection of a hole are limited, and therefore position recognition cannot be achieved in cases where the hole is enlarged, reduced or rotated.

The invention has been made in order to overcome the foregoing problems, and one of the objects of the invention is, therefore, to provide a position recognition method which requires a small memory capacity and reduces the processing time and by which the position of a concavity or convexity defined in an object can be recognized irrespective of the posture of the object photographed within a three-dimensional space.

In accomplishing this and other objects, there is provided, in accordance with the invention, a position recognition method wherein the photographic image of an object having a concavity or convexity defined therein is converted into data in a specified feature space; detection is performed to determine whether the specified feature space data possessed by each elementary area of the converted image has a symmetric relation with one possessed by another elementary area, with a virtual center of the concavity or convexity being the center of symmetry; and the position of the concavity or convexity of the object is recognized based on the detection.

In the above-described position recognition method, the photo-graphic image of an object having a concavity or convexity is converted into specified feature space data such as gradient direction data and normal direction data by the technique of, for example, template matching. While shifting a virtual center of the concavity or convexity on the converted image, it is determined whether the feature space data possessed by each elementary area has a symmetric relation with one possessed by another elementary area, with the virtual center being the point of symmetry. If a symmetric pair with respect to the virtual center is detected (i.e., if an elementary area has feature space data which is symmetric to one possessed by another elementary area), this virtual center is regarded as the true center of the concavity or convexity and the position of the concavity or convexity is then recognized with this true center. Each elementary area may be composed of, for example, a pixel region, 2×2 pixel region or 1×2 pixel region.

Since the position of the concavity or convexity is recognized by determining whether the feature space data possessed by each elementary area has a symmetric relation with one possessed by another elementary area, with the virtual center of the concavity or convexity being the point of symmetry, the recognition operation does not require a large memory capacity and long processing time. In addition, such an arrangement makes it possible to recognize the position of the concavity or convexity defined in the object, irrespective of the posture of the object which has been photographed within a tree-dimensional space.

Preferably, the detection to determine whether the feature space data possessed by each elementary area has a symmetric relation with one possessed by another elementary area with the virtual center of the concavity or convexity being the center of symmetry includes counting of the number of symmetric pairs, and if the number of symmetric pairs is equal to a specified value or more, the position of the concavity or convexity defined in the photographed object is recognized. This detection is preferably performed on every specified region the center of which is the virtual center. The specified region is composed of, for example, M×M (M is an integer which is not smaller than 3) elementary areas and the virtual center is located in the elementary area in the middle of the region. Further, the photographic image mentioned herein may be a range image or contrast image.

Other objects of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and accompanying drawings which are given by way of illustration only, and thus are not limitative of the present invention, and wherein:

FIGS. 1 to 9 provide illustrations of an embodiment of a position recognition method according to the invention, in which gradient vector space data is used as the feature space data;

FIG. 1 is a block diagram of the embodiment of a position recognition method according to the invention;

FIG. 2 is a flow chart of a program described in conjunction with FIG. 1;

FIG. 3 shows a model in a gradient vector space described in conjunction with FIG. 2;

FIG. 4 illustrates the direction of each gradient vector which is directed towards the center of a hole and a number assigned thereto, the gradient vector and its number being described in conjunction with FIG. 2;

FIG. 5 shows a Z coordinate range image after smoothing described in conjunction with FIG. 2;

FIG. 6 shows the converted image of the Z coordinate range image in the gradient vector space, the converted image being described in conjunction with FIG. 2;

FIG. 7 shows a set of masks used in template matching described in conjunction with FIG. 2;

FIG. 8 illustrates counting of the number of symmetric pairs with respect to a virtual center A, which is described in conjunction with FIG. 2;

FIG. 9 is a count table described in conjunction with FIG. 2;

FIGS. 10 to 16 provides another embodiment of the position recognition method of the invention, in which normal vector space data is used as the feature space data;

FIG. 10 corresponds to FIG. 3 and shows a model in a normal vector space;

FIG. 11 corresponds to FIG. 4 and illustrates the direction of each normal vector which is directed outwards from the center of a hole and a number assigned thereto;

FIGS. 12 to 14 correspond to FIG. 5, and show an X coordinate range image, Y coordinate range image and Z coordinate range image, respectively, each image being obtained after smoothing;

FIG. 15 corresponds to FIG. 7 and shows a set of basic normal vectors used in template matching; and FIG. 16 corresponds to FIG. 6 and shows the converted image of the X, Y and Z coordinate range images in the normal vector space.

DESCRIPTION OF THE PREFERRED EMBODIMENTS

With reference to the accompanying drawings, a preferred embodiment of a position recognition method according to the invention will be hereinafter described.

Figure 1:
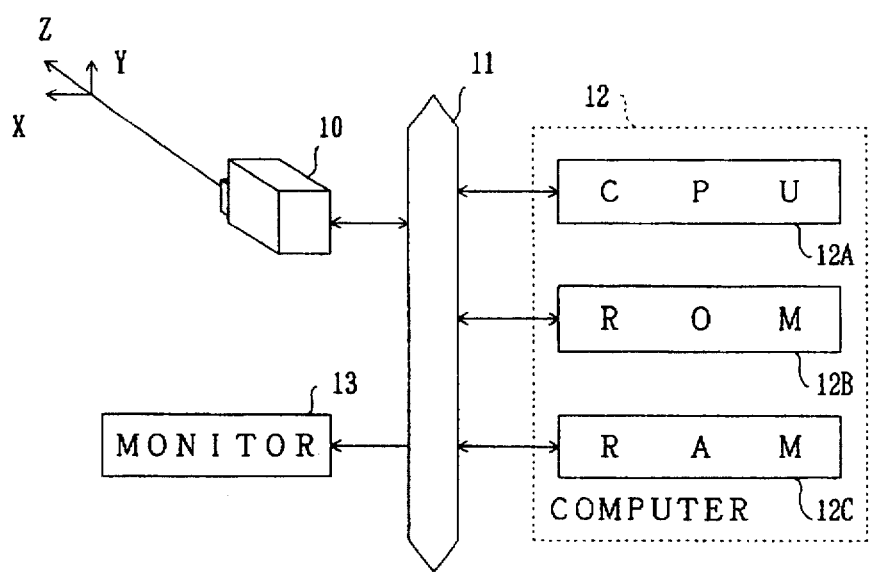

As shown in FIG. 1, an object having a hole (i.e., concavity) is photographed by a three-dimensional camera 10 in this embodiment and a Z coordinate range image which represents the depth of the object is moved onto a bus 11 to output to a computer 12, together with an X coordinate range image and Y coordinate range image. The computer 12 is comprised of a central processing unit (CPU) 12A for executing a specified program; a read only memory (ROM) 12B for storing the specified program; and a random access memory (RAM) 12C which includes various registers necessary for executing the program and a working area. This working area includes storages for the X, Y and Z coordinate range images, Prewitt operator ("Image Analysis Handbook", P554 to 555, Mikio Takagi et al. University Tokyo Press) used in this embodiment and a model created in a feature space. In this embodiment, while the computer 12 executes the specified program, the positional data on the hole defined in the photographed object is displayed on a monitor 13.

Figure 2:
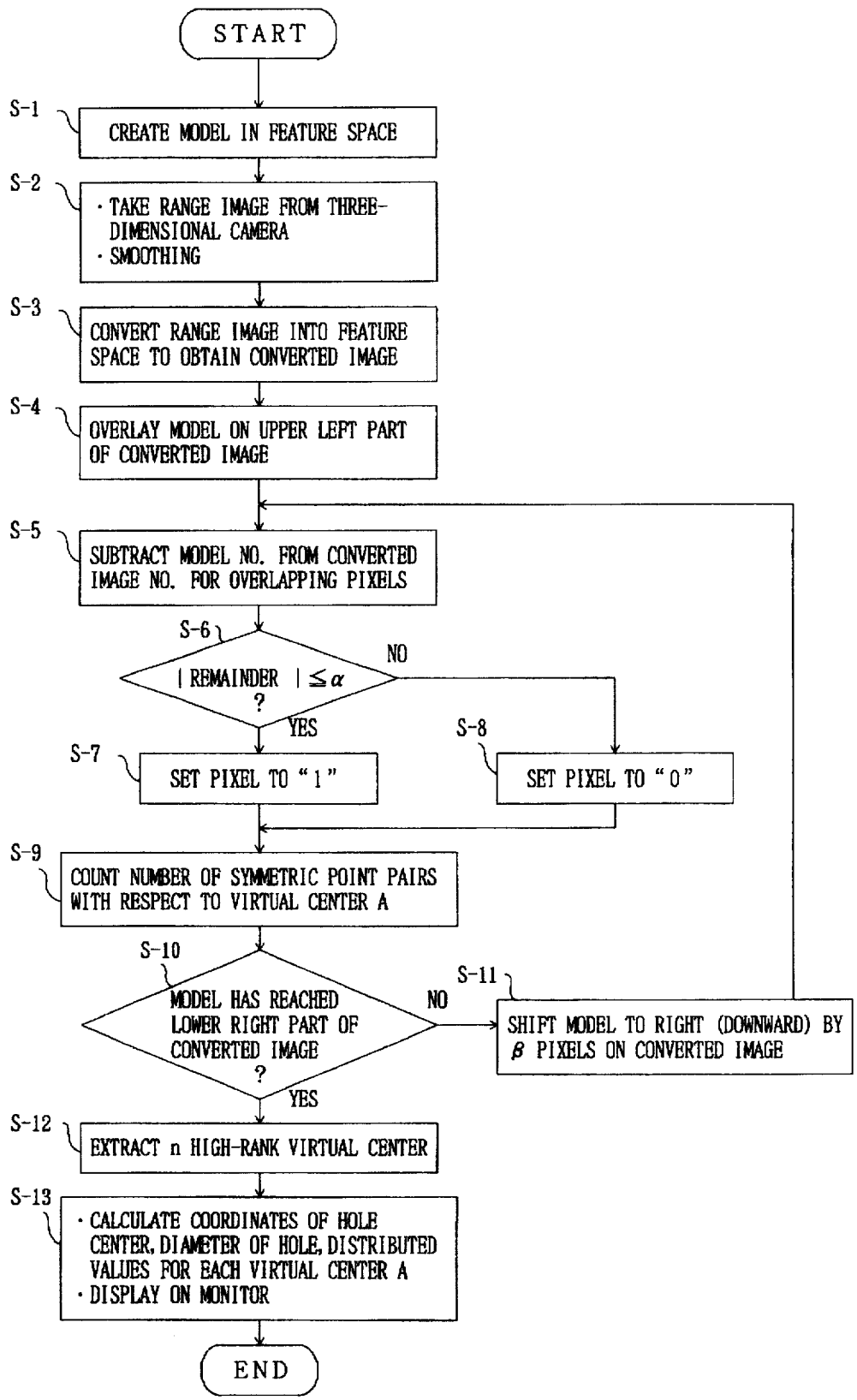

Referring to the flow chart of FIG. 2, the basic operation performed by the above program will be described below.

Figures 3, 4, 5:
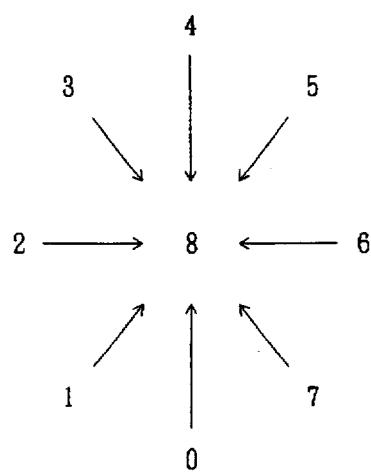

S-1: First of all, an M×M pixel region (3×3 pixel region in this embodiment), one side of which consists of M pixels and exceeds the diameter of the hole (i.e., concavity) of the object to be recognized, is created. As shown in FIG. 3, 9 pixels constitute the M×M pixel region and, specifically, 8 pixels are radially arranged with respect to the pixel (hereinafter referred to as "central pixel") positioned at the center. A number is assigned to each pixel and these numbers represent the feature of the hole which is to be recognized with the central pixel being as the center thereof. More concretely, the numbers assigned to the pixels except for the central pixel represent the gradient vector directions shown in FIG. 4 and the number "8" assigned to the central pixel indicates that the pixel does not have a vector direction. Such a model is created in a feature space (gradient vector space in this embodiment) as shown in FIG. 3.

S-2: N×N pixels (N≧M)(7×7 pixels in this embodiment) of X, Y and Z coordinate range images are taken from the three-dimensional camera 10. Then, smoothing is applied fully to the X, Y, Z coordinate range images, thereby obtaining a Z coordinate range image. The Z coordinate range image obtained after smoothing in this embodiment is shown in FIG. 5. In the Z coordinate range image shown in FIG. 5, the greater the number is, the further the pixel is positioned from the three-dimensional camera 10 in the direction of the Z-axis.

S-3: The Z coordinate range image shown in FIG. 5 is converted into an image in the feature space shown in FIG. 6, by determining the feature of each pixel in each local area of the image in the following manner, using template matching according to Prewitt Method.

The strongest gradient vector direction for each pixel is searched, and this vector direction is assigned to the corresponding pixel, thereby converting Z coordinate range image data possessed by each pixel into gradient vector direction data. In this embodiment, template matching is used for the assignment of the gradient vector direction in the conversion. In the template matching, 8 kinds of mask patterns which correspond to the gradient vector directions shown in FIG. 7 are used, and the numbers assigned to the gradient vector directions in FIG. 7 correspond those assigned to the gradient vector directions shown in FIG. 4. The 3×3 pixel region which includes 8 pixels enclosing the object pixel is matched to the Z coordinate range image shown in FIG. 5 and each pixel of the Z coordinate range image is multiplied by the corresponding value of each mask pattern. Then, the products obtained by the mask pattern are summed and the mask pattern by which the largest sum has been obtained is found. The number allocated to the gradient vector direction corresponding to the mask pattern which has the largest sum is allocated to the object pixel.

S-4 to S-11: The model shown in FIG. 3 is overlaid on the upper left part of the converted image shown in FIG. 6 in such a manner that the virtual center A of the concavity of the object is located on the upper left of the center of the converted image. As to the pixels overlapping with each other, the number assigned to each pixel of the model is subtracted from the number assigned to the corresponding pixel of the converted image. If the remainder is not more than±α, "1" is assigned to the pixel, and if the remainder is more than±α, "0" is assigned to the pixel. In this embodiment, α is "0 " and therefore the result is as shown in FIG. 8(a). Then, the number of symmetric point pairs (i.e. the number of two symmetric points) in FIG. 8(a) is counted (the point of symmetry is the virtual center A). No symmetric point pairs exist in the case of FIG. 8(a), so that 0 is set in the count table shown in FIG. 9 at the position corresponding to the virtual center A.

Figures 9, 10, 11:
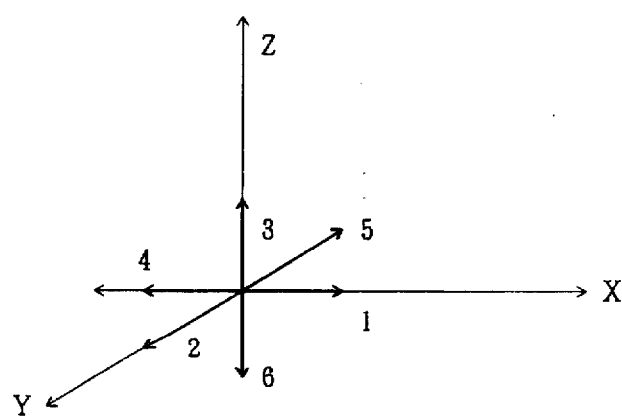

Thereafter, the virtual center A (i.e., the model) is shifted to the right β pixels at a time (one pixel at a time in this embodiment) on the converted image and the above operation is repeated. When the model reaches the right end of the image, the model is then shifted down by β pixels (one pixel in this embodiment). Then, the model is similarly shifted from the left end to the right end one pixel at a time and the above operation is repeated until the model reaches the lower right end, whereby the count table shown in FIG. 9 is obtained. Note that when the virtual center A is positioned on the center of the converted image, the result which corresponds to FIG. 8(a) is as shown in FIG. 8(b), and the number of symmetric point pairs with respect to the virtual center A is 4. Therefore, 4 is set at the position corresponding to the virtual center A, in the count table of FIG. 9.

S-12: From the virtual centers A shown in the count table of FIG. 9, n high-rank virtual centers A (i.e., the virtual center A having the highest count value to the one having the n-th highest count value) are extracted. "n" corresponds to the number of holes which has been presumed and preset. In this embodiment, n=1, so that the virtual center A to be extracted is one positioned in the middle of the count table of FIG. 9, that is, in the middle of the Z coordinate range image after smoothing shown in FIG. 5.

S-13: The symmetric points with respect to each virtual center A extracted are regarded as the edges of the hole. In this embodiment, the positions of "1" s in the FIG. 8(b) are regarded as the edges of the hole. From the X, Y, Z coordinate range images of the pixels corresponding to the respective edge positions, the total X coordinate value, total Y coordinate value, total Z coordinate value of the symmetric points are obtained by conversion. Then, the coordinates of the center of the hole and the diameter of the hole which correspond to the virtual center A are determined from the total coordinate values of the symmetric points and described as follows.

Coordinates of hole center: $(\Sigma X/P, \Sigma Y/P, \Sigma Z/P)$

Diameter of hole:

$\Sigma$ the distance between the symmetric point pairs/P where P: number of symmetric point pairs $\Sigma X$: total X-coordinate value of symmetric points
$\Sigma Y$: total Y-coordinate value of symmetric points
$\Sigma Z$: total Z-coordinate value of symmetric points Then, distributed values for the symmetric points for each virtual center A when the symmetric points are fitted to a sphere are calculated by the least squares method.

It is then determined whether the diameter of the hole and the distributed values for each virtual center A, which have been obtained by the calculation, fall in a preset allowable range. If they fall in the preset allowable range, the virtual center A is determined as the true center of the hole, and the coordinates of the hole center, the diameter of the hole etc. for the virtual center A are displayed on the monitor 13.

Although the feature of the hole of the object is represented by 8 kinds of gradient vectors whose directions are different from one another, it may be represented by 12 gradient vectors having different directions in order to achieve higher accuracy, or by 4 gradient vectors having different directions in order to increase the processing speed. Instead of "Prewitt method", "Robinson method" or "Kirsh method" may be used for converting the Z coordinate range image into an image in the feature space ("Image Analysis Handbook", P554 to 555, Mikio Takagi et al. University Tokyo Press).

In the foregoing embodiment, the number of holes defined in the object is preset as n, and n high-rank virtual centers A are extracted based on the number of symmetric point pairs for each virtual center A. However, the virtual centers A may be automatically extracted using "P-tile method" or "Ohtsu method"("Image Analysis Handbook", P502 to 505, Mikio Takagi et. al. University Tokyo Press).

Further, although gradient vector space data is used as feature space data in the foregoing embodiment, normal vector space data may be used in the following way.

Like the foregoing embodiment, a 3×3 pixel region is first set as shown in FIG. 10, and numbers which are assigned to the respective normal vectors shown in FIG. 11 and representative of the normal vector directions are assigned to the pixels of the 3×3 pixel region, respectively. Thus, a model in a normal vector space is created.

Then, 7×7 pixels of X coordinate range image, Y coordinate range image and Z coordinate range image are taken from the three-dimensional camera 10 and smoothing is fully applied to these images like the foregoing embodiment, whereby the X coordinate range image, Y coordinate range image and Z coordinate range image (this is similar to one shown in FIG. 5) shown in FIGS. 12 to 14 are obtained. In this embodiment, the 3×3 pixel region is regarded as the smallest unit of a plane and the normal vectors of the plane are obtained in the following manner.

In the case of the X coordinate range image, Y coordinate range image and Z coordinate range image shown in FIGS. 12 to 14 for example, vectors $\vec{BA}$, $\vec{DC}$ are first obtained.

$\vec{BA}=(20, 20, 70)-(0, 0, 40)=(20, 20, 30)$ $\vec{DC}=(0, 20, 40)-(20, 0, 40)=(-20, 20, 0)$ Then, a normal vector $\vec{\delta}$ is obtained from the vectors $\vec{BA}$, $\vec{DC}$.

$\vec{\delta}=\vec{DC}\times\vec{BA}=(600, 600, -800)$

Then, $\vec{\delta e}=\vec{\delta}/|\vec{\delta}|=(0.514, 0.514, -0.686)$

The maximum value is obtained by template matching, using 6 kinds of basic normal vectors shown in FIG. 15 which correspond to the normal vector directions shown in FIG. 11. The number assigned to the basic normal vector direction which corresponds to the maximum value is assigned to the object pixel. In the above example, $\vec{\delta}=(0, 0, -1)$ is assigned.

The arithmetic operation described earlier is performed sequentially on each pixel of the X, Y, Z coordinate range images, thereby converting the X, Y, Z coordinate range images into an image in the normal vector space, as shown in FIG. 16.

The model shown in FIG. 10 is overlaid on the converted image shown in FIG. 16 and symmetric point pairs are sequentially counted in the same manner as described earlier.

More precise template matching is possible by using vectors of diagonal directions such as $(1/\sqrt{2}, 1/\sqrt{2}, 0)$, $(0, 1/\sqrt{2}, 1/\sqrt{2})$ and $(1/\sqrt{2}, 0, 1/\sqrt{2})$ in addition to the basic normal vectors.

In these embodiments, a small model, i.e., 3×3 pixel region is used as the model in the feature space. However, a 64×64 pixel region may be used. The 64×64 pixel region is overlaid on the converted image, and as to the pixels overlapping with each other, the number assigned to each pixel of the model is subtracted from the number assigned to the corresponding pixel of the converted image. In this case, subtraction is performed 64×64 =4,096 times. Since the number of subtracting operations to be performed is proportional to the square of the number of pixels M, the processing speed decreases as the number of pixels M in the M×M pixel region increases. In order to prevent the decrease in the processing speed when the number of pixels M increases, the following technique is adapted. For example, when the square of the number of pixels M is not less than a specified value γ, m is obtained from the following equation. m is converted into an integer and the subtraction is performed on every |m| pixels. With this technique, the processing time will not decrease to more than a certain extent even if the number of pixels M increases.

$$(M/m)^2 = \gamma$$

For example, when the specified value γ is 100 (i.e., when the number of pixels M is 10 or more) and the number of pixels M is 64, m is obtained from the following equation.

$$m = M/\sqrt{\gamma} = 64/\sqrt{100} = 6.4$$

Therefore, the subtraction is performed on every 6 pixels.

Although the position of a hole (concavity) defined in an object is recognized in the foregoing embodiments, a convexity may be recognized by setting an appropriate model in a feature space. A groove and bar may be recognized as one example of the concavity and that of the convexity, respectively.

Although the position of a concavity is recognized based on the three-dimensional range image of the object, position recognition may be recognized based on contrast image instead of the range image. Also, position recognition may be performed in the following way. Points the differential or differential of the second order of which is more than a specified value are extracted from a range image or contrast image. The number of symmetric point pairs with respect to each of the extracted points is counted. With this method, a concavity or convexity defined in an object can be recognized although their exact coordinates cannot be obtained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A position recognition method comprising the steps of:
   creating a filter of a feature to be recognized in a feature space;
   obtaining a range image of an object from a three dimensional camera;
   converting said range image from said camera into an image in feature space to obtain a converted image;
   overlaying the filter on an upper left part of the converted image such that a virtual center of the feature of the object is located on an upper left of a center of the converted image;
   subtracting each pixel of the filter from each pixel of the overlaid converted image;
   determining if a remainder is more than a predetermined value and assigning a first value to the pixel and if the remainder is not more than the predetermined value assigning a second value to the pixel;
   counting the number of two symmetric points with respect to virtual center, wherein a third value is set at a position corresponding to the virtual center;
   shifting the virtual center a predetermined number of pixels to the right and repeat the above operation;
   when the filter reaches the right end of the image, shifting the filter down by a predetermined number of pixels and repeating the above operation until the filter reaches the lower right end of the image;
   determining the virtual center having the highest count value for two symmetric points; and
   determining edges of the feature based upon symmetric points with respect to the virtual center having the highest count value and determining the coordinates in the center of the feature and diameter of the feature based upon the distribution of the values for the virtual center having the highest count value; and
   displaying results on a monitor.

2. A position recognition method, comprising the steps of:
   converting a photographic image of an object, having a concavity or convexity defined therein, into data in a specified feature space;
   extracting elementary areas from the converted image data in the feature space;
   detecting symmetric pairs of pixels in each elementary area, a symmetric pair of pixels being defined as two pixels the vectors and positions of which are symmetric with respect to a virtual center of the concavity or convexity center, the virtual center being established for each elementary area;
   determining the virtual concavity or convexity center of the elementary area having the highest number of symmetric pairs of pixels as the true center of the concavity or convexity; and
   recognizing the position of the concavity or convexity of the object with said true center.

3. A position recognition method, comprising the steps of:
   converting a photographic image of an object, having at least one concavity or convexity defined therein, into data in a specified feature space;
   extracting elementary areas from the converted image data in the feature space;
   detecting symmetric pairs of pixels in each elementary area, a symmetric pair of pixels being defined as two pixels the vectors and positions of which are symmetric with respect to a virtual center of the concavity or convexity center, the virtual center being established for each elementary area;
   determining the virtual concavity or convexity center of at least one elementary area as the true center of said at least one concavity or convexity, provided that the number of symmetric pairs of pixels in the elementary area is no less than a specified number; and
   recognizing the position of the concavity or convexity of the object with said true center.

4. A position recognition method comprising the steps of:
   creating a filter of a feature to be recognized in a feature space;
   obtaining a range image of an object from a three dimensional camera;
   converting said range image from said camera into an image in feature space to obtain a converted image;
   overlaying the filter on an upper left part of the converted image such that a virtual center of the feature of the object is located on an upper left of a center of the converted image;
   subtracting each pixel of the filter from each pixel of the overlaid converted image;
   determining if a remainder is more than a predetermined value and assigning a first value to the pixel and if the remainder is not more than the predetermined value assigning a second value to the pixel;
   counting the number of two symmetric points with respect to virtual center, wherein a third value is set at a position corresponding to the virtual center;
   shifting the virtual center a predetermined number of pixels to the right and repeat the above operation;
   when the filter reaches the right end of the image, shifting the filter down by a predetermined number of pixels and repeating the above operation until the filter reaches the lower right end of the image;

determining the virtual centers respectively having the first to n-th highest count values for two symmetric points;

determining edges of the feature based upon symmetric points with respect to the virtual centers respectively having the first to n-th highest count values and determining the coordinates in the center of the feature and diameter of the feature based upon the distribution of the values for the virtual centers respectively having the first to n-th highest count values; and displaying results on a monitor.

5. The position recognition method as claimed in claims 2 or 3, wherein the photographic image is metric image or contrast image.

6. The position recognition method as claimed in any one of claims 2 or 3, wherein the specified feature space data is gradient direction data or normal direction date.

7. The position recognition method as claimed in claims 2 or 3, wherein the elementary area is composed of M×M areas pixels, with M being an integer which is not smaller than 3, and wherein each virtual center is located at the center of each elementary area.

* * * * *